(12) United States Patent
Jang

(10) Patent No.: US 7,102,083 B2
(45) Date of Patent: Sep. 5, 2006

(54) JOINTING STRUCTURE AND JOINTING METHOD FOR SUPERCONDUCTING CABLE

(75) Inventor: Hyun-man Jang, Gunpo-si (KR)

(73) Assignee: LG Cable Ltd., Seoul (KR)

( * ) Notice: Subject to any disclaimer, the term of this patent is extended or adjusted under 35 U.S.C. 154(b) by 0 days.

(21) Appl. No.: 10/953,709

(22) Filed: Sep. 29, 2004

(65) Prior Publication Data

US 2005/0067184 A1    Mar. 31, 2005

(30) Foreign Application Priority Data

Sep. 29, 2003    (KR) .................. 10-2003-0067551

(51) Int. Cl.
*H01B 12/00* (2006.01)
(52) U.S. Cl. .................................. 174/125.1
(58) Field of Classification Search ............ 174/125.1
See application file for complete search history.

(56) References Cited

U.S. PATENT DOCUMENTS 5,843,584 A * 12/1998 Raber ..................... 428/594
6,313,408 B1 * 11/2001 Fujikami et al. ......... 174/125.1
6,596,945 B1 * 7/2003 Hughey et al. .......... 174/125.1

FOREIGN PATENT DOCUMENTS

JP    04-098773    *    3/1992
JP    04098773         3/1992

* cited by examiner

*Primary Examiner*—Kamand Cuneo
*Assistant Examiner*—Yuriy Semenenko
(74) *Attorney, Agent, or Firm*—John P. White, Esq.; Cooper & Dunham LLP

(57) ABSTRACT

An intermediate jointing structure having excellent mechanical and electrical characteristics and method of preparing the same. The intermediate jointing structure includes a metal pipe and a jointing sleeve. The metal pipe is inserted between a pair of superconducting cables and is fixed to the formers by welding. A plurality of superconductor wires, shorter than the conductive metal tube, are arranged around a conductive metal tube in a longitudinal direction. The arranged superconductor wires are taped with Ag tape so as to form the jointing sleeve. The jointing sleeve is jointed and fixed on an outer surface of the metal pipe.

6 Claims, 2 Drawing Sheets

JOINTING STRUCTURE AND JOINTING METHOD FOR SUPERCONDUCTING CABLE

BACKGROUND OF THE INVENTION

1. Field of the Invention

The present invention relates to a jointing structure for superconducting cable and a method for jointing the superconducting cable, and more particularly to an intermediate joint structure of a superconducting cable that prevents cracks by remarkably improving: physical bonding strength of a jointing interface, a rise in temperature of the refrigerant, and overloading of a cooling system due to such a temperature rise, as well as having excellent electrical characteristics, and a jointing method thereof.

2. Description of the Related Art

Generally, a power cable using a superconductor transmits a great amount of electric power and has very small power loss in comparison with a conventional power cable.

For the purpose of transmitting a large amount of electric power over a long distance by using the superconducting cable, an intermediate jointing member between superconducting cables is absolutely necessary. The intermediate jointing member includes a conductor-ointing section, an insulating section, and a refrigerant circulation structure for cooling the superconducting cable under a critical temperature.

A conventional technology for the conductor jointing section is disclosed in Japanese Patent Laid-open Publication No. HEI 4-98773, and will be briefly described with reference to FIG. 1 as follows.

The conventional conductor-jointing member is constructed as follows. First, inner formers 41 and 51 of a cable are cut to a length shorter than the superconductor tapes 42 and 52 surrounding the formers 41 and 51. A jointing member 4 with a laminated structure identical to that of the cable is inserted between the formers 41 and 51 of both cables. Finally, the formers 41 and 51 of the cables are jointed at both ends of the jointing member 4 by silver solders 8 and 9, so that the superconductor tapes 42 and 52 are jointed with each other by silver solder 7.

The jointing member 4 is formed by winding superconductor tape 62 around a metal pipe 61 with a laminated structure identical to the cables. The superconductor tape 62 is constructed by sequentially laminating a conductive metal layer 63, a superconductor layer 65, and a conductive metal layer 64 thereon.

Therefore, in the conductor-jointing section, electric current supplied to the superconductor layer 45 of one cable flows to the superconductor layer 55 of the other cable via the superconductor layer 65 of the jointing member 4.

However, in the conventional method for jointing cables, since the jointing member is jointed with the formers of the cables by silver solder, cracks may be generated at an interface between the jointing member and the cables, due to heat shrinkage during a cooling operation below a critical temperature. If a refrigerant infiltrates the fragile interface and a cracked region under high pressure (about 10 bar), the jointing section may fracture or its contact resistance may increase. Moreover, due to the temperature rise caused by Joule's heat, the cooling load of the cooling system increases, as well, a quench phenomenon of a superconductor may arise.

Moreover, since temperature excessively rises when both ends of the jointing member are jointed with a former by the silver solder, the superconductor tape may become deteriorated.

SUMMARY OF THE INVENTION

Therefore, the present invention has been made in view of the above and/or other problems, and it is an aspect of the present invention to provide a jointing structure of a superconducting cable for improving jointing strength of an intermediate member of a cable so as to prevent cracks, a rise in temperature of the refrigerant, and overload of a cooling system due to such a temperature rise, as well as to provide high electrical characteristics, and a method for jointing the same.

In accordance with the present invention, the above and other aspects can be accomplished by the provision of an intermediate jointing structure of a superconducting cable for jointing together a pair of superconducting cables, having superconductor layers around formers made of metal pipes. The intermediate jointing structure includes a metal pipe, inserted between the pair of superconducting cables and affixed to the formers by welding, and a jointing sleeve, jointed and affixed on an outer surface of the metal pipe and taped with Ag (silver) tape after arranging a plurality of superconductor wires (shorter than the conductive metal tube) around the conductive tube in the longitudinal direction.

Preferably, the metal pipe includes a material identical to that of the formers of the superconducting cables, and the conductive metal tube includes Ag.

Moreover, in the case that the superconducting cable has a multilayered conductor, a multilayered superconducting cable is jointed by constructing a multilayered jointing sleeve by arranging a plurality of superconductor wires (shorter than the Ag tape layer) on the Ag tape layer, and taping the arranged superconductor wires with Ag tape.

In accordance with an aspect of the present invention, the above and other aspects can be accomplished by the provision of a method for jointing together a pair of superconducting cables provided with superconductor layers around formers made of metal pipes, the method including the steps of constructing a jointing sleeve by arranging a plurality of superconductor wires (shorter than a conductive metal tube) around the conductive metal tube in a longitudinal direction, and taping the arranged superconductor wires with Ag tape, applying a heat treatment to the jointing sleeve at 800 to 850 degrees centigrade for 40 hours or longer, constructing a jointing member by jointing and fixing the jointing sleeve around a longer metal pipe, fixing the metal pipe of the jointing member to the formers of both superconducting cables by welding, and jointing the superconductor layer of both superconducting cables around both ends of the conductive metal tube of the jointing member.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
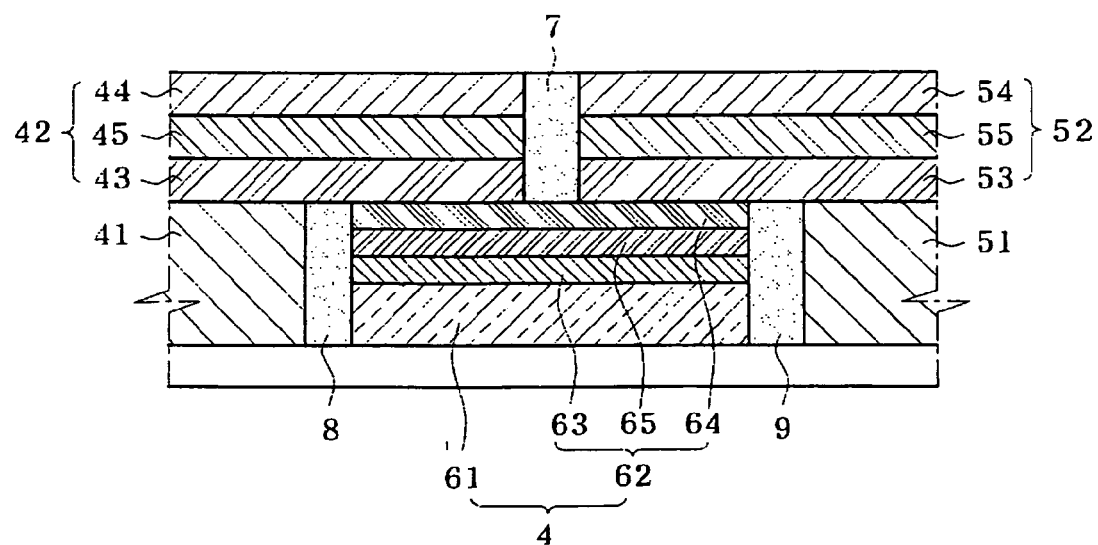
FIG. 1 is a cross-sectional view of a conventional jointing structure of a superconducting cable.
Figure 2:
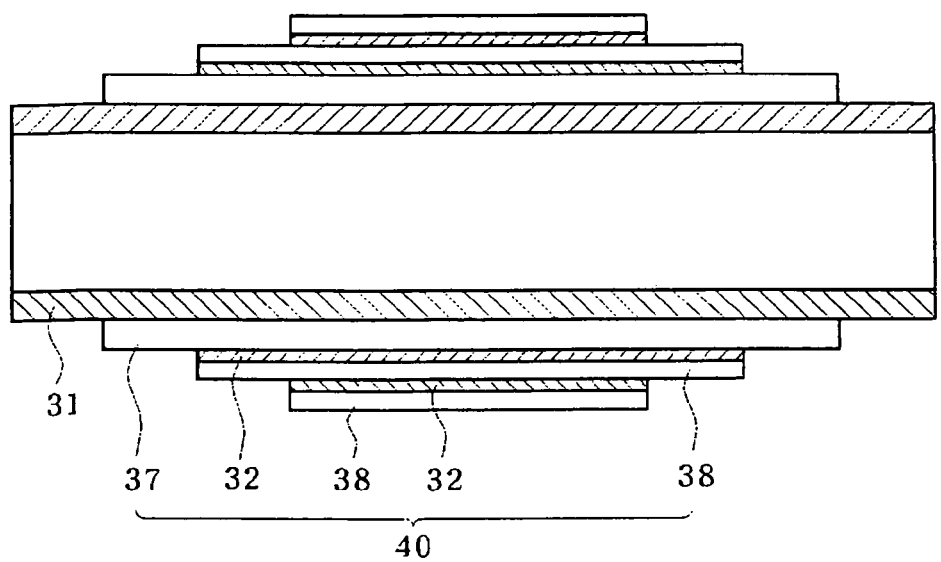
FIG. 2 is a cross-sectional view of a jointing member for a superconducting cable according to the present invention.
Figure 3:
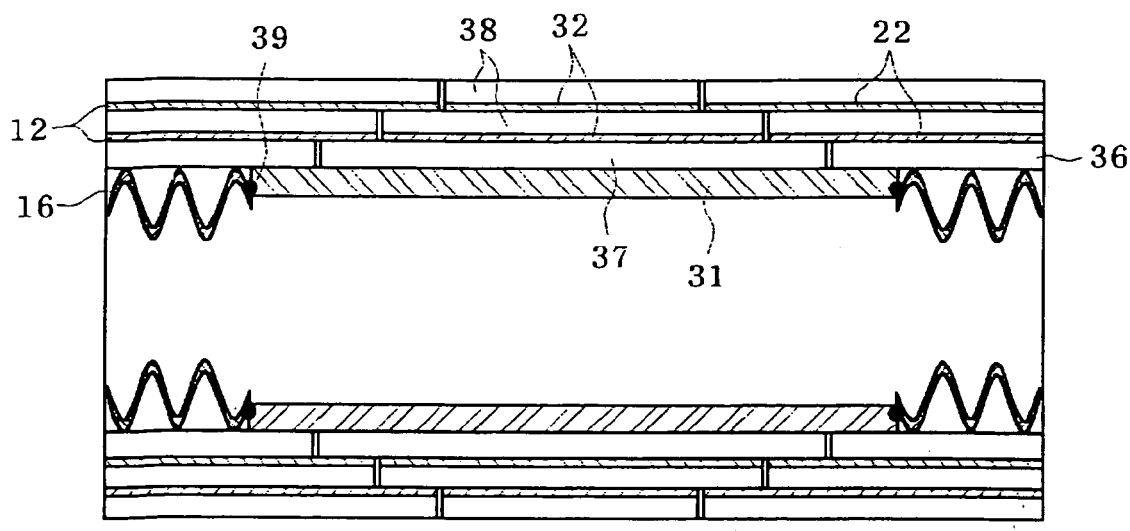
FIG. 3 is a cross-sectional view of an intermediate jointing structure of a superconducting cable using the jointing member in FIG. 2.

FIGS. 2 and 3 are cross-sectional views shows a jointing member for a superconducting cable and an intermediate cable-jointing structure using the jointing member according to the present invention, respectively.

As shown in the drawings, the intermediate cable-jointing structure includes a metal pipe 31 and a jointing sleeve 40. The metal pipe 31 is welded and affixed to formers 16 of both superconducting cables. A plurality of superconductor wires 32 are arranged around a conductive metal tube 37 in a longitudinal direction, and are taped with an Ag tape 38. Next, the superconductor wires 32 are affixed around the metal pipe 31 by means of shrinkage fitting, so that the jointing sleeve 40 is completed.

The metal pipe 31 is made of a material identical to the formers 16 of the superconducting cables. Both ends of the metal pipe 31 are affixed to the formers 16 of the superconducting cables by welding 39, so that the metal pipe 31 has a high adhesive strength to prevent separation due to heat shrinkage.

The jointing sleeve 40 is integrated around the metal pipe 31 by the shrinkage fitting. Several dozen superconductor wires 32 are arranged around the conductive metal tube 37 in a longitudinal direction and are taped with the AG tape 38, so that the jointing sleeve 40 is completed.

In this case, in order to smoothly conduct electricity, the conductive metal tube 37 is preferably made of an AG tube, which has low electric resistance.

Moreover, the jointing sleeve 40 may be constructed with a single layer of the superconductor wire 32. In the case of jointing superconducting cables with a multilayered structure, the superconducting cables are jointed as follows. First, several dozen superconductor wires 32 (shorter than the Ag tape layer 38) are arranged on the Ag tape layer 38. Next, the jointing sleeve 40 is formed to have a multilayered structure corresponding to the superconducting cables, by taping the Ag tape 38 around the superconductor wires 32. Thereby, the superconducting cables are jointed with each other at an intermediate region through the multilayered sleeve 40.

The jointing sleeve 40 constructed as described above undergoes heat treatment for more than 40 hours at a range of 800 to 850 degrees centigrade to obtain superconducting characteristics. The jointing sleeve 40 is jointed and integrated by metal diffusion between the two pieces of Ag at a high temperature.

The jointing sleeve 40 has an inner diameter 0.2 mm less than the outer diameter of the metal pipe 31. The jointing sleeve 40 is heated and expanded, and the metal pipe 31 is shrunk by cooling. Next, the jointing sleeve 40 is assembled with the metal pipe 31. The jointing sleeve 40 and the metal pipe 31 are in close contact with each other at room temperature, so as to form an integrated jointing member.

Further, a first superconductor layer 12 of the superconducting cable is jointed with a surface of the conductive metal tube 37 made of an Ag tube by Pb—Sn (lead-tin) or the like, and the secondary superconductor layer 12 is jointed with a secondary Ag tape layer 38 by Pb—Sn or the like.

According to the method of jointing superconductor cables as described above, several dozen superconductor wires 32 (shorter than the conductive metal tube 37), are arranged around the conductive metal tube 37 in a longitudinal direction and are taped with the Ag tape 38, so that the jointing sleeve 40 is thereby constructed.

Meanwhile, for the joint of the multilayered superconducting cables, several dozen superconductor wires 32, shorter than the Ag tape layer 38, are arranged on the Ag tape layer 38 and are taped with the Ag tape 38, so that the jointing sleeve 40 having a multilayered structure corresponding to the superconducting cables is constructed.

The jointing sleeve 40 undergoes heat treatment at temperatures of between 800 and 850 degrees centigrade for more than 40 hours so as to have superconductor characteristics. The finished jointing sleeve 40 has no contact resistance between layers, due to metal diffusion between Ag at a high temperature.

Next, the jointing member is completed by jointing and fixing the jointing sleeve 40 around the metal pipe 31, which is formed to be longer than the jointing sleeve 40.

In this case, the metal pipe 31 has an outer diameter 0.2 mm greater than the inner diameter of the jointing sleeve 40, and is cooled and shrunk. The jointing sleeve 40 is heated and expanded so as to assemble the metal pipe 31 and the jointing sleeve 40. The jointing sleeve 40 and the metal pipe 31 are in close contact with each other at room temperature so as to form an integrated jointing member.

After constructing the jointing member, the metal pipe 31 of the jointing member is fixed to both formers 16 of the superconducting cables by arc welding 39, so that mechanical strength is maintained when cooling the superconducting cables.

Further, a first superconductor layer 12 of the superconducting cable is jointed to a surface of the conductive metal tube 37 of the jointing member by Pb—Sn or the like, and the secondary superconductor layer 12 is jointed to a first Ag tape layer 38 by Pb—Sn or the like, so that a pair of superconducting cable are jointed.

As apparent from the above description, since a metal pipe made of a material identical to that of a former of a superconducting cable is jointed by means of arc welding, physical jointing strength at a jointing interface is remarkably increased. Therefore, the mechanical strength is maintained for a long time after cooling the superconducting cables.

Moreover, since the jointing sleeve, including the superconductor tape, is jointed to the superconductor layer of the cables in a line, the electric resistance is decreased. An earth-fault current is distributed to the Ag layer of the jointing sleeve when a fault occurs; therefore, electric safety is ensured.

Since just the Ag layers of identical materials are jointed by the metal diffusion in the heat treatment of the jointing sleeve, the contact resistance at an interface is remarkably reduced. The conductivity is increased, and heat generation at the interface is remarkably reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An intermediate jointing structure for a superconducting cable, for jointing together a pair of superconducting cables having superconductor layers around formers made of metal pipes, the intermediate jointing structure comprising: a metal pipe inserted between the pair of superconducting cables and fixed directly to the formers by welding; a jointing sleeve jointed and fixed around an outer surface of the metal pipe, the jointing sleeve including a conductive metal tube jointed and fixed around the outer surface of the metal pipe, a superconductive layer affixed around an outer surface of the conductive metal tube, and Ag taping around an outer surface of the superconductor layer, wherein the superconductor layer is shorter than the conductive metal tube and the jointing sleeve is formed integrally through metal diffusion by a heat treatment.

2. The intermediate jointing structure as set forth in claim 1, wherein the metal pipe comprises a material identical to that of the farmers of the superconducting cables.

3. The intermediate jointing structure as set forth in claim 1, wherein the conductive metal tube comprises Ag.

4. The intermediate jointing structure as set forth in claim 1, wherein a multilayered superconducting cable is jointed by constructing a multilayered jointing sleeve by arranging a plurality of superconductor wires shorter than an Ag tape layer on the Ag tape layer, and taping the arranged superconductor wires with Ag tape.

5. The intermediate jointing structure of claim 1, wherein the formers to which the metal pipe is fixed directly by welding have a wrinkled configuration.

6. A method for jointing a pair of superconducting cables provided with superconductor layers around metal pipe formers with each other, the method comprising the steps of: constructing a jointing sleeve by arranging a plurality of superconductor layers around a conductive metal tube in a longitudinal direction; the jointing sleeve jointed and fixed around an outer surface of a metal pipe, the jointing sleeve including the conductive metal tube jointed and fixed around the outer surface of the metal pipe, a superconductive layer affixed around an outer surface of the conductive metal tube, and Ag taping around an outer surface of the superconductor layer, wherein the superconductor layer is shorter than the conductive metal tube, applying a heat treatment to the jointing sleeve at 800 to 850 degrees centigrade for 40 hours or longer; jointing and fixing the jointing sleeve around a longer metal pipe; fixing directly the metal pipe inserted between the pair of superconducting cables to the formers of both superconducting cables by welding; and jointing the superconductor layer of both superconducting cables around both ends of the conductive metal tube.

* * * * *